US012643123B2

(12) United States Patent
Choi et al.

(10) Patent No.: US 12,643,123 B2
(45) Date of Patent: Jun. 2, 2026

(54) SLURRY SUPPLY DEVICE AND SLURRY SUPPLY METHOD

(71) Applicant: LG Energy Solution, Ltd., Seoul (KR)

(72) Inventors: Hyung-Woo Choi, Daejeon (KR);
Sung-Mo Kang, Daejeon (KR);
Sang-Min Kim, Daejeon (KR);
Kyoung-Rok Mun, Daejeon (KR);
Jong-Goo Park, Daejeon (KR);
Jong-Woo Shin, Daejeon (KR);
Do-Young Ahn, Daejeon (KR); **Jae-Pil
Lee, Daejeon (KR); Shin-Wook Jeon**,
Daejeon (KR); Sang-Hoon Choy,
Daejeon (KR)

(73) Assignee: LG Energy Solution, Ltd., Seoul (KR)

( * ) Notice: Subject to any disclaimer, the term of this
patent is extended or adjusted under 35
U.S.C. 154(b) by 81 days.

(21) Appl. No.: 18/698,387

(22) PCT Filed: Sep. 30, 2022

(86) PCT No.: PCT/KR2022/014857
§ 371 (c)(1),
(2) Date: Apr. 4, 2024

(87) PCT Pub. No.: WO2023/090633
PCT Pub. Date: May 25, 2023

(65) Prior Publication Data
US 2024/0399410 A1 Dec. 5, 2024

(30) Foreign Application Priority Data
Nov. 18, 2021 (KR) ........................ 10-2021-0159839

(51) Int. Cl.
B05C 11/10 (2006.01)
H01M 4/04 (2006.01)
H01M 10/04 (2006.01)

(52) U.S. Cl.
CPC ........... B05C 11/10 (2013.01); H01M 4/0404
(2013.01); H01M 10/0404 (2013.01)

(58) Field of Classification Search
CPC .. B05C 11/10; H01M 4/0404; H01M 10/0404
See application file for complete search history.

(56) References Cited

U.S. PATENT DOCUMENTS

2007/0036902 A1 2/2007 O'Neal
2009/0225123 A1 9/2009 Katoh
(Continued)

FOREIGN PATENT DOCUMENTS

CN 101522316 A 9/2009
CN 102348832 A 2/2012
(Continued)

OTHER PUBLICATIONS

JP 2017 188397 (English translation) (Year: 2017).*
(Continued)

*Primary Examiner* — Jonathan Bradford
(74) *Attorney, Agent, or Firm* — Lerner David LLP

(57) ABSTRACT

A slurry supply device includes a slurry tank for storing
slurry; a temperature controller for supplying hot or cold
water to the slurry tank to control the temperature of the
slurry; and a double pipe for supplying the slurry to the
slurry tank while being connected to the slurry tank and for
allowing hot or cold water to move to control the tempera-
ture of the slurry.

10 Claims, 3 Drawing Sheets

10

→ MOVEMENT DIRECTION OF
SLURRY
---→ MOVEMENT DIRECTION OF
HOT OR COLD WATER

(56)                    References Cited

U.S. PATENT DOCUMENTS

| 2010/0151140 A1 | 6/2010 | O'Neal |
| 2010/0230834 A1 | 9/2010 | Sakata et al. |
| 2013/0056092 A1 | 3/2013 | Wakamatsu et al. |
| 2013/0092241 A1 | 4/2013 | Sakata et al. |
| 2014/0377451 A1 | 12/2014 | Kim et al. |

FOREIGN PATENT DOCUMENTS

| CN | 111604181 A | 9/2020 |
| CN | 113634458 A | 11/2021 |
| CN | 214682676 U | 11/2021 |
| JP | H03109957 A | 5/1991 |
| JP | H0833860 A | 2/1996 |
| JP | 2000000509 A | 1/2000 |
| JP | 3222588 B2 | 10/2001 |
| JP | 2009028630 A | 2/2009 |
| JP | 4570889 B2 | 10/2010 |
| JP | 5282417 B2 | 9/2013 |
| JP | 2017188397 A | 10/2017 |
| KR | 20070009905 A | 1/2007 |
| KR | 100829069 B1 | 5/2008 |
| KR | 101020883 B1 | 3/2011 |
| KR | 20160148955 A | 12/2016 |
| KR | 102073188 B1 | 2/2020 |

OTHER PUBLICATIONS

International Search Report for Application No. PCT/KR2022/014857 mailed Jan. 20, 2023, pp. 1-3.

Extended European Search Report including Written Opinion for Application No. 22895842.7 dated Jun. 24, 2024, pp. 1-7.

Search Report dated Jul. 23, 2025 from the Office Action for Chinese Application No. 202280008058.3 issued Jul. 26, 2025, pp. 1-3.

Search Report dated Feb. 4, 2026 from the Office Action for Chinese Application No. 202280008058.3 issued Feb. 5, 2026, 2 pages.

* cited by examiner

SLURRY SUPPLY DEVICE AND SLURRY SUPPLY METHOD

CROSS-REFERENCE TO RELATED APPLICATIONS

The present application is a national phase entry under 35 U.S.C. § 371 of International Application No. PCT/KR2022/014857 filed on Sep. 30, 2022, which claims the benefit of Korean Patent Application No. 10-2021-0159839 filed on Nov. 18, 2021 with the Korean Intellectual Property Office, the entire contents of which are incorporated herein by reference.

TECHNICAL FIELD

The present disclosure relates to a slurry supply device and a slurry supply method, and more specifically, to a slurry supply device and a slurry supply method capable of maintaining a uniform temperature of the slurry.

BACKGROUND ART

As technology development and demand for mobile devices increase, demand for secondary batteries as energy sources rapidly increases, and these secondary batteries include electrode assemblies, which are power generation elements.

The electrode assembly has a form in which a positive electrode, a separator, and a negative electrode are stacked at least once, and the positive electrode and the negative electrode, which make up the electrode, are prepared by coating a positive electrode active material slurry and a negative electrode active material slurry, which make up a slurry, on a current collector made of aluminum foil and copper foil, respectively, and drying.

In order to make the charge/discharge characteristics of a secondary battery uniform, the slurry may be evenly coated on a current collector, and conventionally, the coating has been applied using a slot die coater.

When the slurry stored in a slurry tank is coated on a current collector using a slot die coater, the temperature of the slurry has a great effect on the quality of electrode coating.

Specifically, when thermal deformation occurs in the slot die coater due to the slurry at a temperature deviating from a preset range, a gap between the slot die coater and the coating roll is changed, resulting in uneven loading during coating of the slurry.

In order to prevent such uneven loading, the temperature of the slurry may be uniformly stabilized within a preset range, but in the case of the prior art, there is a problem in that the temperature of the slurry is non-uniform and may not be stabilized because of the temperature difference between the slurry remaining in the pipe connected to the slurry tank and the slurry stored in the slurry tank.

Specifically, when the slurry is mixed and then transferred to the slurry tank through the pipe to be stored, not all the slurry is transferred to the slurry tank, and some slurry remains in the pipe without being transferred to the slurry tank.

Here, the slurry transferred to and stored in the slurry tank is maintained at a temperature within a preset range, but the slurry remaining in the pipe has a temperature different from that of the slurry stored in the slurry tank while heat loss occurs due to heat exchange with the outside.

In addition, when the slurry remaining in the pipe flows into the slurry tank in the next transfer, the temperature difference between the slurry remaining in the pipe and the slurry stored in the slurry tank causes changes in the temperature of the entire slurry, and the slurry is not stabilized while deviating from a preset temperature, thus causing electrode coating defects.

Technical Problem

The present disclosure is designed to solve the problems of the related art, and therefore the present disclosure is directed to providing a slurry supply device and a slurry supply method capable of maintaining a uniform slurry temperature to be stabilized and accordingly, improving the quality of electrode coating.

Technical Solution

According to one aspect of the present disclosure, there may be provided a slurry supply device including a slurry tank for storing slurry; a temperature controller for supplying hot or cold water to the slurry tank to control the temperature of the slurry; and a double pipe for supplying the slurry to the slurry tank while being connected to the slurry tank and for allowing hot or cold water to move to control the temperature of the slurry.

Also, the double pipe may include an inner pipe disposed inside through which the slurry flows; and an outer pipe disposed outside the inner pipe to surround the inner pipe and provided to allow the hot or cold water to flow.

In addition, the hot or cold water supplied from the temperature controller to the slurry tank may pass through the slurry tank and may flow back into the temperature controller through the outer pipe of the double pipe connected to the slurry tank.

Also, the slurry inside the slurry tank and the slurry remaining in the double pipe may be controlled to have a temperature within a preset range by hot or cold water supplied from the temperature controller.

In addition, the slurry tank may be provided in two, wherein the first slurry tank may be connected to the first temperature controller and the first double pipe to be controlled so that the temperature of the slurry is within a preset range, and the second slurry tank may be connected to the second temperature controller and the second double pipe, may be connected to the first slurry tank to receive slurry from the first slurry tank, and may be controlled so that the slurry supplied from the first slurry tank has a preset temperature.

Also, the slurry tank may be connected to a third double pipe, and the slurry tank may supply the slurry to the slot die coater through the third double pipe.

In addition, the slurry supply device may further include a double pipe temperature controller connected to the double pipe; a temperature sensor for measuring the temperature of the slurry remaining in the double pipe and the temperature of the slurry stored in the slurry tank, respectively; and a control unit for controlling the temperature controller or the double pipe temperature controller so that the temperature of the slurry remaining in the double pipe and the temperature of the slurry stored in the slurry tank have a preset range according to the measured value of the temperature sensor.

Also, the temperature controller may be provided to supply hot or cold water to the slurry tank, and the double pipe temperature controller may be provided to supply hot or cold water to the double pipe.

Meanwhile, according to another aspect of the present disclosure, there may be provided a slurry supply method including a step of supplying hot or cold water to the slurry tank from the temperature controller to control the temperature of the slurry; a step in which hot or cold water supplied to the slurry tank moves to the double pipe connected to the slurry tank; and a step in which hot or cold water moved to the double pipe flows into the temperature controller.

Also, the slurry supply method may include a step in which the slurry inside the slurry tank and the slurry remaining in the double pipe are controlled to have a temperature within a preset range by the hot or cold water supplied from the temperature controller.

Advantageous Effects

According to embodiments of the present disclosure, while hot or cold water moves to a double pipe to which the slurry is supplied, the temperature of the slurry is maintained uniformly and stabilized, which results in an improved quality of electrode coating.

DETAILED DESCRIPTION OF THE PREFERRED EMBODIMENTS

Figures 1, 2:
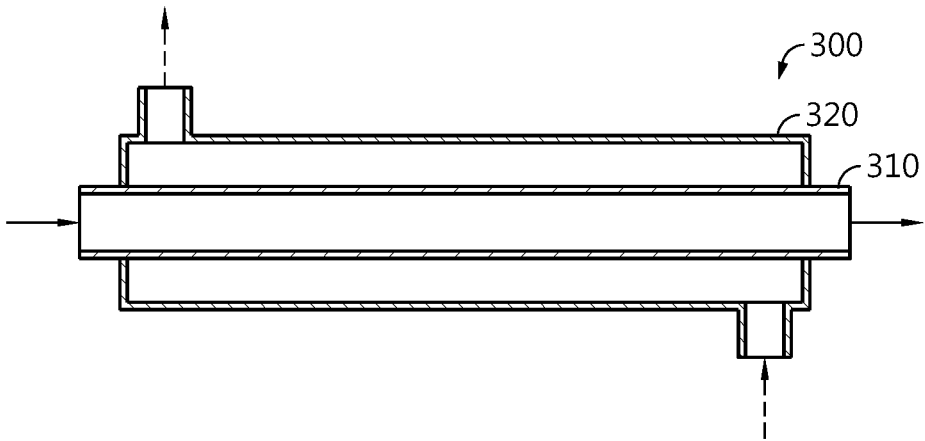
FIG. 1 is schematic diagram of a slurry supply device according to a first embodiment of the present disclosure.
FIG. 2 is a side view of a double pipe in a slurry supply device according to a first embodiment of the present disclosure.

Hereinafter, preferred embodiments of the present disclosure will be described in detail with reference to the accompanying drawings. It should be understood that the terms used in the specification and the appended claims should not be construed as limited to general and dictionary meanings, but interpreted based on the meanings and concepts corresponding to technical aspects of the present disclosure on the principle that the inventor is allowed to define terms appropriately for the best explanation. Therefore, the description proposed herein is a preferable example for the purpose of illustrations only, not intended to limit the scope of the present disclosure, so it should be understood that other equivalents and modifications could be made thereto without departing from the scope of the present disclosure.

In the drawings, the size of each component or a specific portion constituting the component may be exaggerated, omitted, or schematically illustrated for convenience and clarity of description. Therefore, the size of each component may not fully reflect the actual size. If it is determined that a detailed description of a related known function or configuration may unnecessarily obscure the present disclosure, such a description will be omitted.

As used herein, the term 'coupling' or 'connection' refers to not only a case where one member and another member are directly coupled or directly connected, but also a case where one member is indirectly coupled or indirectly connected to another member through a joint member.

FIG. 1 is schematic diagram of a slurry supply device according to a first embodiment of the present disclosure, and FIG. 2 is a view showing a double pipe in a slurry supply device according to a first embodiment of the present disclosure.

Referring to FIG. 1, a solid arrow indicates a movement direction of slurry, and a dotted arrow indicates a movement direction of hot or cold water. This arrow structure is also applicable to other drawings in the same way.

Referring to FIG. 1, the slurry supply device 10 according to the first embodiment of the present disclosure includes a slurry tank 100, a temperature controller 200, and a double pipe 300.

Referring to FIG. 1, the slurry tank 100 is provided to store slurry. That is, the slurry is stored in the slurry tank 100. The slurry is a material applied on a current collector in order to manufacture an electrode of a secondary battery, and various materials such as an active material and a conductive material are mixed and prepared to be flowable.

The slurry tank 100 is connected to the double pipe 300 and receives the slurry through the double pipe 300. After the slurry is mixed, it is transferred to the slurry tank 100 through the double pipe 300.

As described above, when the temperature of the slurry deviates from a preset range, thermal deformation of the slot die coater changes a gap between the slot die coater and the coating roll.

In addition, loading unevenness may be caused during coating of the slurry, which may result in electrode coating defects, and thus it is necessary to maintain the temperature of the slurry within a preset range.

In order to maintain the temperature of the slurry within a preset range, the slurry tank 100 receives hot or cold water from the temperature controller 200.

Although not shown in the drawings, the slurry tank 100 may have a double structure including a first tank and a second tank surrounding the first tank.

The slurry is stored in the first tank of the slurry tank 100. Hot or cold water supplied from the temperature controller 200 may flow inside the second tank surrounding the first tank, and the temperature of the slurry may be maintained within a preset range by heat exchange between the hot or cold water flowing inside the second tank and the slurry.

The temperature controller 200 is provided to supply hot or cold water to the slurry tank 100 to control the temperature of the slurry.

As described above, when the slurry tank 100 is formed in a dual structure having the first tank and the second tank surrounding the first tank, the temperature controller 200 is connected to the second tank to send hot or cold water to the second tank. In addition, the temperature of the slurry may be controlled by heat exchange between hot or cold water and the slurry.

The fluid supplied from the temperature controller 200 to the slurry tank 100 is not limited to hot or cold water and may be vary the temperature of the water, but hereinafter, for convenience of description, fluid that is hot or cold water will be primarily described.

In addition, the temperature of hot or cold water may be experimentally determined according to various conditions such as the size of the slurry tank 100, the material and size of the slot die coater, and the like.

The double pipe 300 is connected to the slurry tank 100 to supply slurry to the slurry tank 100, and to supply hot or cold water to control the temperature of the slurry.

Referring to FIG. 2, the double pipe 300 may be configured to include an inner pipe 310 and an outer pipe 320. The inner pipe 310 is disposed inside the outer pipe 320 and results in a flow path for slurry to flow. For example, after the slurry is mixed in an external mixer, it is transferred to the slurry tank 100 through the inner pipe 310 of the double pipe 300 and stored therein.

In addition, the outer pipe 320 is disposed outside the inner pipe 310 to surround the inner pipe 310 and result in a flow path for hot or cold water. When hot or cold water flows through the outer pipe 320, the hot or cold water contacts the inner pipe 310, and thus heat is exchanged by conduction with the slurry flowing through the inner pipe 310, thereby controlling the temperature of the slurry to be maintained within a preset range.

The hot or cold water flowing along the outer pipe 320 may be the same hot or cold water as the hot or cold water supplied from the temperature controller 200, or the hot or cold water supplied from a separate device other than the temperature controller 200.

In the first embodiment and the second embodiment to be described later, the hot or cold water supplied from the temperature controller 200 is provided to flow along the outer pipe 320 of the double pipe 300. With this embodiment, hot or cold water flowing along the slurry tank 100 and the hot or cold water flowing along the outer pipe 320 of the double pipe 300 have the same supply source.

In the third and fourth embodiments described below, the hot or cold water supplied from the double pipe temperature controller 400 provided separately from the temperature controller 200 flows along the outer pipe 320 of the double pipe 300. As such, the hot or cold water flowing along the slurry tank 100 and the hot or cold water flowing along the outer pipe 320 of the double pipe 300 do not have the same supply source.

The structure of each double pipe 300 of the second to fourth embodiments is common to the structure of the double pipe 300 of the first embodiment.

Referring to FIG. 1, the hot or cold water supplied from the temperature controller 200 to the slurry tank 100 may pass through the slurry tank 100 and flow back into the temperature controller 200 through the outer pipe 320 of the double pipe 300 connected to the slurry tank 100.

The hot or cold water supplied from the temperature controller 200 flows into the second tank of the slurry tank 100 to maintain the temperature of the slurry within a preset range, and then flows to the outer pipe 320 of the double pipe 300 to maintain the temperature of the slurry remaining in the inner pipe 310 of the double pipe 300 within a preset range.

Because the hot or cold water for controlling the temperature of the slurry stored in the slurry tank 100 and the hot or cold water for controlling the temperature of the slurry remaining in the inner pipe 310 of the double pipe 300 are the same, the temperature of the slurry stored in the slurry tank 100 and the temperature of the slurry remaining in the inner pipe 310 of the double pipe 300 may be controlled to be substantially similar.

The hot or cold water supplied from the temperature controller 200 flows into the second tank of the slurry tank 100 and the temperature of the hot or cold water may change via heat exchange with the slurry stored in the slurry tank 100. If the difference between the temperatures of the hot or cold water supplied from the first temperature controller 200 and the slurry stored in the slurry tank 100 is minimal, heat loss will be minimal, and thus, through minimal adjustments, the temperature of the slurry stored in the slurry tank 100 and the temperature of the slurry remaining in the inner pipe 310 of the double pipe 300 may be controlled to be the same or substantially similar.

By the hot or cold water supplied from the temperature controller 200, the slurry inside the slurry tank 100 and the slurry remaining in the double pipe 300 may be controlled to have a temperature within a preset range, for example, the same temperature or nearly the same temperature, but a similar temperature within the margin of error.

If the slurry inside the slurry tank 100 and the slurry remaining in the double pipe 300 have the same or similar temperature, even if the slurry remaining in the double pipe 300 flows into the slurry tank 100 in the next transfer, the entire slurry temperature may be uniformly maintained, thereby preventing electrode coating defects.

Hereinafter, the operation and effect of the slurry supply device 10 according to the first embodiment of the present disclosure will be described with reference to the drawings.

Referring to FIG. 1, the hot or cold water supplied from the temperature controller 200 to the slurry tank 100 flows into the slurry tank 100 to maintain the temperature of the slurry stored in the slurry tank 100 within a preset range.

In addition, the hot or cold water supplied from the temperature controller 200 to the slurry tank 100 passes through the slurry tank 100 and flows into the outer pipe 320 of the double pipe 300 to maintain the temperature of the slurry remaining in the inner pipe 310 of the double pipe 300 within a preset range.

Because the hot or cold water supplied from the temperature controller 200 controls the temperature of not only the slurry stored in the slurry tank 100, but also the slurry remaining in the inner pipe 310 of the double pipe 300, the slurry inside the slurry tank 100 and the slurry remaining in the double pipe 300 are controlled to have the same or similar temperature.

Figure 3:
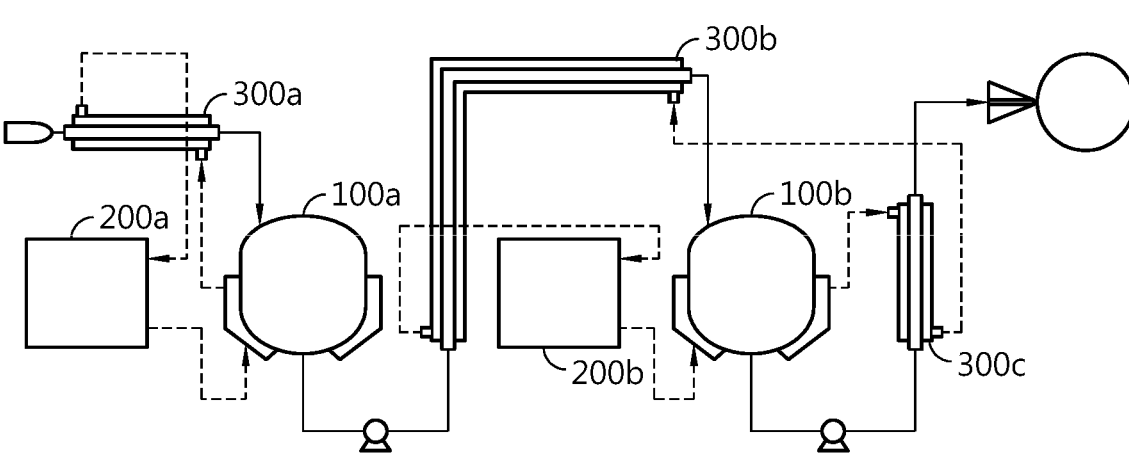
FIG. 3 is a schematic diagram of a slurry supply device according to a second embodiment of the present disclosure.

FIG. 3 is a schematic diagram of a slurry supply device according to a second embodiment of the present disclosure. The following description that is similar to the description of first embodiment above is replaced with the above description.

Referring to FIG. 3, the second embodiment differs from the first embodiment of FIG. 1 in that the slurry tank 100 includes two slurry tanks 100. The number of slurry tanks 100 is not limited to two, and more slurry tanks 100 may be provided if necessary.

The first slurry tank 100a is connected to the first temperature controller 200a and the first double pipe 300a to be controlled so that the temperature of the slurry is maintained within a preset range.

The second slurry tank 100b is connected to the second temperature controller 200b and the second double pipe 300b is connected to the first slurry tank 100a to receive slurry from the first slurry tank 100a, and is controlled so that the slurry supplied from the first slurry tank 100a has a preset temperature.

The temperature control of the slurry of the first slurry tank 100a, the first temperature controller 200a and the first double pipe 300a, the temperature control of the slurry by the second slurry tank 100b, the second temperature controller 200b, and the double pipe 300b are common to the similar devices of the first embodiment.

As described above, when the slurry tank 100 is provided in a plurality, the temperature of the slurry may be more precisely controlled. For example, after controlling a temperature similar to the target temperature through the first slurry tank 100a, the first temperature controller 200a and the first double pipe 300a, the slurry temperature may be controlled to have the same temperature as the target temperature through the second slurry tank 100b, the second temperature controller 200b and the second double pipe 300b.

Referring to FIG. 3, the second slurry tank 100b may be connected to a third double pipe 300c. The third double pipe 300c connects the second slurry tank 100b and the slot die coater. The second slurry tank 100b may supply the slurry to the slot die coater through the third double pipe 300c.

Because the temperature of the slurry stored in the second slurry tank 100b is uniformly maintained by the third double pipe 300c and supplied to the slot die coater, thermal deformation of the slot die coater may be prevented.

The third double pipe 300c connecting the slurry tank 100 and the slot die coater may be also applied in the first embodiment.

Figure 4:
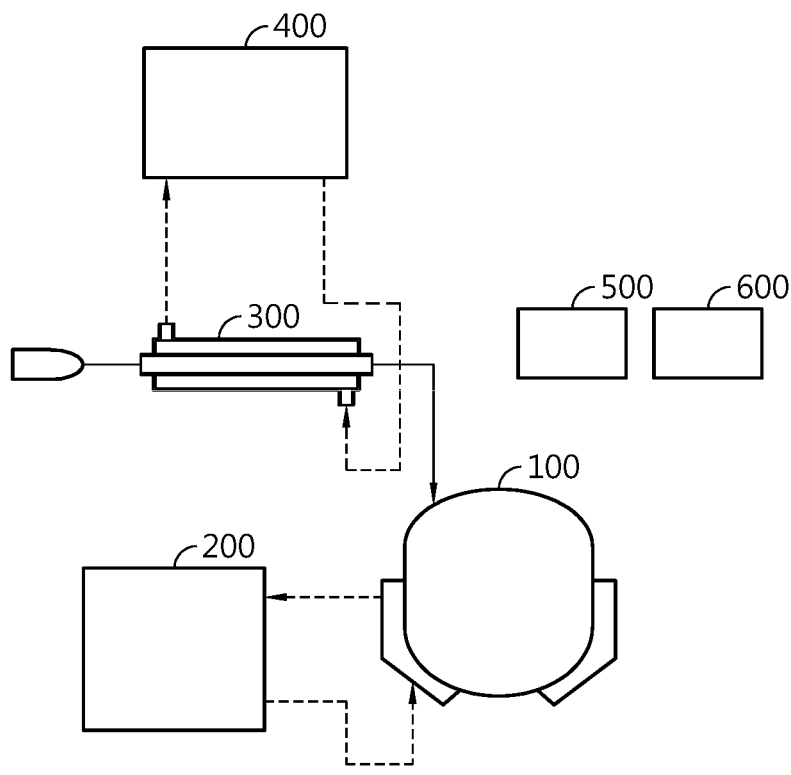
FIG. 4 is a schematic diagram of a slurry supply device according to a third embodiment of the present disclosure.

FIG. 4 is a schematic diagram of a slurry supply device according to a third embodiment of the present disclosure. The following description that is similar to the description of the first or second embodiments above is replaced with the above description.

Referring to FIG. 4, the double pipe temperature controller 400 is connected to the double pipe 300, and the double pipe temperature controller 400 is provided to supply hot or cold water to the double pipe 300. In addition, the temperature controller 200 supplies hot or cold water to the slurry tank 100.

The hot or cold water for controlling the temperature of the slurry stored in the slurry tank 100 and the hot or cold water for controlling the temperature of the slurry remaining in the double pipe 300 are different from each other in the supply source.

A temperature sensor 500 is provided, and the temperature sensor 500 measures the temperature of the slurry remaining in the double pipe 300 and also measures the temperature of the slurry stored in the slurry tank 100. The temperature sensor 500 for measuring the temperature of the slurry remaining in the double pipe 300 and the temperature sensor 500 for measuring the temperature of the slurry stored in the slurry tank 100 may be provided separately.

The control unit 600 controls the temperature controller or the double pipe temperature controller 400 so that the temperature of the slurry remaining in the double pipe 300 and the temperature of the slurry stored in the slurry tank 100 have a preset range according to the measured value of the temperature sensor 500. Accordingly, the temperature of the slurry may be uniformly maintained and stabilized.

Figure 5:
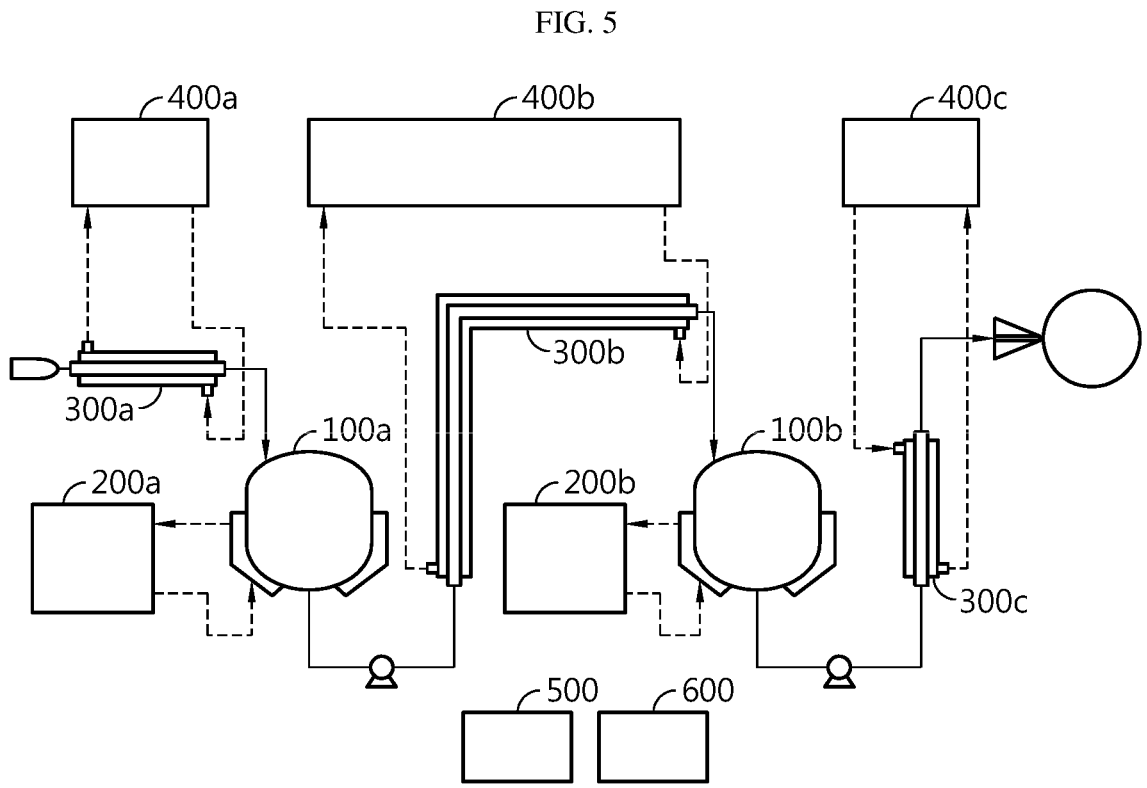
FIG. 5 is a schematic diagram of a slurry supply device according to a fourth embodiment of the present disclosure.

FIG. 5 is a schematic diagram of a slurry supply device according to a fourth embodiment of the present disclosure. The following description that is similar to the description for the first to third embodiments above is replaced with the above description.

Referring to FIG. 5, the fourth embodiment differs from the third embodiment of FIG. 4 in that the slurry tank 100 includes two slurry tanks 100. The number of slurry tanks 100 is not limited to two, and more slurry tanks 100 may be provided if necessary.

The first slurry tank 100a is connected to the first temperature controller 200a, the first double pipe 300a and the first double pipe temperature controller 400a are configured to be controlled so that the temperature of the slurry is maintained within a preset range.

The second slurry tank 100b is connected to the second temperature controller 200b, the second double pipe 300b and the second double pipe temperature controller 400b, is connected to the first slurry tank 100a to receive the slurry from the first slurry tank 100a, and is controlled so that the slurry supplied from the first slurry tank 100a has a preset temperature.

As described above for the other embodiments, when the slurry tank 100 is provided in a plurality, the temperature of the slurry may be more precisely controlled.

The temperature control of the slurry by the first slurry tank 100a, the first temperature controller 200a, the first double pipe 300a the first double pipe temperature controller 400a, the temperature control of the slurry by the second slurry tank 100b, the second temperature controller 200b, the second double pipe 300b, and the second double pipe temperature controller 400b are similar to that of the third embodiment.

The operation and effect of the slurry supply method according to an embodiment of the present disclosure will be described with reference to the drawings. The description similar to the description of the slurry supply device 10 according to each embodiment of the present disclosure described above is replaced with the above description.

Among the contents described in the slurry supply method according to an embodiment of the present disclosure, the contents that may be applied to the slurry supply device 10 according to each embodiment of the present disclosure described above are also applied to the slurry supply device 10 according to each of the above-described embodiments of the present disclosure.

First, hot or cold water is supplied from the temperature controller 200 to the slurry tank 100 to control the temperature of the slurry. Slurry is stored in the slurry tank 100.

Next, the hot or cold water supplied to the slurry tank 100 flows to the double pipe 300 connected to the slurry tank 100.

Next, the hot or cold water that previously flowed to the double pipe 300 flows into the temperature controller 200 and circulates.

Accordingly, the slurry inside the slurry tank 100 and the slurry remaining in the double pipe 300 may be controlled to have a temperature maintained within a preset range by the hot or cold water supplied from the temperature controller 200.

While the present disclosure has been hereinabove described with regard to a limited number of embodiments and drawings, the present disclosure is not limited thereto, and those skilled in the art can ascertain that a variety of modifications and changes may be made thereto within the technical aspects of the present disclosure and the equivalent scope of the appended claims.

INDUSTRIAL APPLICABILITY

The present disclosure relates to a slurry supply device and a slurry supply method used in the manufacturing process of a secondary battery, and is particularly applicable to industries related to the secondary battery.

What is claimed is:
1. A slurry supply device comprising:
a slurry tank configured to supply a slurry to a slot die coater;
a temperature controller configured to supply hot or cold water to the slurry tank to control a temperature of the slurry stored in the slurry tank; and
a double pipe communicating with the slurry tank and configured to supply the slurry to the slurry tank and also configured to convey the hot or cold water to control the temperature of the slurry.

2. The slurry supply device according to claim 1,
wherein the double pipe comprises:
an inner pipe through which the slurry flows; and
an outer pipe surrounding the inner pipe and configured to
convey the hot or cold water.

3. The slurry supply device according to claim 2,
wherein the hot or cold water supplied from the tempera-
ture controller to the slurry tank passes through the
slurry tank and flows back into the temperature con-
troller through the outer pipe of the double pipe con-
nected to the slurry tank.

4. The slurry supply device according to claim 3,
wherein the temperature controller is configured to con-
trol the temperature of the slurry inside the slurry tank
and the slurry in the double pipe to maintain the
temperature within a preset range by the hot or cold
water supplied from the temperature controller.

5. The slurry supply device according to claim 4,
wherein the slurry tank includes a first slurry tank and a
second slurry tank,
the first slurry tank is connected to a first temperature
controller and a first double pipe such that that the
temperature of the slurry is controlled within a preset
range, and
the second slurry tank is connected to a second tempera-
ture controller and a second double pipe is connected to
the first slurry tank to receive slurry from the first slurry
tank, the second slurry tank controlled such that the
slurry supplied from the first slurry tank has a preset
temperature.

6. The slurry supply device according to claim 1,
wherein the slurry tank is connected to a third double
pipe, and
the slurry tank supplies the slurry to the slot die coater
through the third double pipe.

7. The slurry supply device according to claim 1, further
comprising:
a double pipe temperature controller connected to the
double pipe;
a temperature sensor for measuring the temperature of the
slurry remaining in the double pipe and the temperature
of the slurry stored in the slurry tank, respectively; and
a control unit for controlling at least one of the tempera-
ture controller and the double pipe temperature con-
troller such that the temperature of the slurry remaining
in the double pipe and the temperature of the slurry
stored in the slurry tank have a preset range according
to a measured value of the temperature sensor.

8. The slurry supply device according to claim 7,
wherein the temperature controller is provided to supply
hot or cold water to the slurry tank, and
the double pipe temperature controller is provided to
supply hot or cold water to the double pipe.

9. A method of supplying slurry, the method comprising:
supplying hot or cold water to a slurry tank from a
temperature controller to control a temperature of
slurry, wherein the slurry tank is configured to supply
the slurry to a slot die coater;
moving the hot or cold water from the slurry tank to a
double pipe connected to supply the slurry to the slurry
tank; and
conveying the hot or cold water from the double pipe into
the temperature controller.

10. The method according to claim 9,
further comprising controlling the temperature of the
slurry inside the slurry tank and the temperature of the
slurry remaining in the double pipe within a preset
range by controlling the hot or cold water supplied
from the temperature controller.

* * * * *